(12) United States Patent
Shen (10) Patent No.: US 8,856,425 B2
(45) Date of Patent: Oct. 7, 2014

(54) METHOD FOR PERFORMING META BLOCK MANAGEMENT, AND ASSOCIATED MEMORY DEVICE AND CONTROLLER THEREOF

(75) Inventor: Yang-Chih Shen, Taipei (TW)

(73) Assignee: Silicon Motion Inc., Jhubei, Hsinchu County (TW)

( * ) Notice: Subject to any disclaimer, the term of this patent is extended or adjusted under 35 U.S.C. 154(b) by 330 days.

(21) Appl. No.: 13/180,559

(22) Filed: Jul. 12, 2011

(65) Prior Publication Data
US 2012/0079169 A1 Mar. 29, 2012

(30) Foreign Application Priority Data
Sep. 27, 2010 (TW) .............................. 99132563 A (51) Int. Cl.
*G06F 12/00* (2006.01)
*G06F 12/02* (2006.01)

(52) U.S. Cl.
CPC .... *G06F 12/0246* (2013.01); *G06F 2212/7208* (2013.01); *G06F 2212/7202* (2013.01)
USPC ........... 711/103; 711/154; 711/165; 711/170; 711/171; 711/172; 711/202; 711/205; 711/207; 711/209; 711/221

(58) Field of Classification Search
USPC ......... 711/103, 154, 165, 170, 171, 172, 202, 711/205, 207, 209, 221
See application file for complete search history.

(56) References Cited

U.S. PATENT DOCUMENTS

| 7,434,122 B2 | 10/2008 | Jo |
| 7,454,670 B2 | 11/2008 | Kim |
| 2005/0144516 A1* | 6/2005 | Gonzalez et al. ................. 714/8 |
| 2011/0004723 A1* | 1/2011 | Kheng-Chong ............. 711/103 |
| 2011/0093649 A1* | 4/2011 | Lee ............................... 711/103 |
| 2012/0239853 A1* | 9/2012 | Moshayedi ................... 711/103 |

FOREIGN PATENT DOCUMENTS

| TW | I272483 | 2/2007 |
| TW | 201003391 | 1/2010 |
| TW | 201007451 | 2/2010 |
| TW | 201007735 | 2/2010 |
| TW | 201015563 | 4/2010 |
| TW | 201027332 | 7/2010 |

\* cited by examiner

*Primary Examiner* — Midys Rojas
(74) *Attorney, Agent, or Firm* — Winston Hsu; Scott Margo (57) ABSTRACT

A method for performing meta block management is provided. The method is applied to a controller of a Flash memory having multiple channels, where the Flash memory includes a plurality of blocks respectively corresponding to the channels. The method includes: utilizing a meta block mapping table to store block grouping relationships respectively corresponding to a plurality of meta blocks, where blocks in each meta block respectively correspond to the channels; and when it is detected that a specific block corresponding to a specific channel within a meta block does not have remaining space for programming, according to the meta block mapping table, utilizing at least one blank block corresponding to the specific channel within at least one other meta block as extension of the specific block, for use of further programming. An associated memory device and a controller thereof are also provided.

20 Claims, 9 Drawing Sheets

| Ch(0) | Ch(1) | Ch(2) | Ch(3) |
|---|---|---|---|
| Logical page address | Logical page address | Logical page address | Logical page address |
| 0x0000 | 0x0001 | 0x0002 | 0x0003 |
| 0x0004 | 0x0005 | 0x0006 | 0x0007 |
| 0x0008 | 0x0009 | 0x0010 | 0x0011 |
| ⋮ | ⋮ | ⋮ | ⋮ |
| 0x(4n) | 0x(4n+1) | 0x(4n+2) | 0x(4n+3) |
| ⋮ | ⋮ | ⋮ | ⋮ |

|   | Ch(0) | Ch(1) | Ch(2) | Ch(3) |
|---|---|---|---|---|
| 0 | 0 | 0 | 0 | X |
| 1 | 1 | X | 1 | 1 |
| 2 | X | 2 | X | 2 |
| 3 | 3 | 3 | 3 | 3 |
| ⋮ | ⋮ | ⋮ | ⋮ | ⋮ |
| (K-3) | X | (K-3) | (K-3) | (K-3) |
| (K-2) | X | (K-2) | (K-2) | (K-2) |
| (K-1) | X | (K-1) | (K-1) | (K-1) |

|   | Ch(0) | Ch(1) | Ch(2) | Ch(3) |
|---|---|---|---|---|
| M(0) | 0 | 0 | 0 | 1 |
| M(1) | 1 | 2 | 1 | 2 |
| M(2) | 3 | 3 | 3 | 3 |
| ⋮ | ⋮ | ⋮ | ⋮ | ⋮ |

The block that is fully programmed first within this meta block

FIG. 5A

The block that is utilized for extension first within this meta block

METHOD FOR PERFORMING META BLOCK MANAGEMENT, AND ASSOCIATED MEMORY DEVICE AND CONTROLLER THEREOF

BACKGROUND OF THE INVENTION

1. Field of the Invention

The present invention relates to access to a Flash memory having multiple channels, and more particularly, to a method for performing meta block management, and to an associated memory device and a controller thereof

2. Description of the Prior Art

As technologies of Flash memories progress in recent years, many kinds of portable memory devices (e.g. memory cards respectively complying with SD/MMC, CF, MS, and XD standards) or solid state drives (SSDs) equipped with Flash memories are widely implemented in various applications. Therefore, the control of access to Flash memories in these memory devices has become an important issue.

Taking NAND Flash memories as an example, they can mainly be divided into two types, i.e. Single Level Cell (SLC) Flash memories and Multiple Level Cell (MLC) Flash memories. Each transistor that is considered a memory cell in SLC Flash memories only has two charge levels that respectively represent a logical value 0 and a logical value 1. In addition, the storage capability of each transistor that is considered a memory cell in MLC Flash memories can be fully utilized. More specifically, the voltage for driving memory cells in the MLC Flash memories is typically higher than that in the SLC Flash memories, and different voltage levels can be applied to the memory cells in the MLC Flash memories in order to record information of at least two bits (e.g. binary values 00, 01, 11, or 10) in a transistor that is considered a memory cell. Theoretically, the storage density of the MLC Flash memories may reach twice the storage density of the SLC Flash memories, which is considered good news for NAND Flash memory manufacturers who encountered a bottleneck of NAND Flash technologies.

As MLC Flash memories are cheaper than SLC Flash memories, and are capable of providing higher capacity than SLC Flash memories while the space is limited, MLC Flash memories have been a main stream for implementation of most portable memory devices on the market. However, various problems of the MLC Flash memories have arisen due to their unstable characteristics. In order to ensure that the access control of a memory device over the Flash memory therein can comply with related standards, the controller of the Flash memory should have some handling mechanisms in order to properly handle its data access operations.

According to the related art, the memory device having the aforementioned handling mechanisms may still suffer from some deficiencies. For example, the handling mechanisms of the related art cannot ensure the channel bandwidth of the respective channels within a Flash memory having multiple channels. In another example, the performance of the related art architecture is poor during sequential reading operations that are performed after random writing operations are performed. Therefore, a novel method is required for performing meta block management in order to enhance the performance of access to the Flash memory.

SUMMARY OF THE INVENTION

It is therefore an objective of the claimed invention to provide a method for performing meta block management, and to provide an associated memory device and a controller thereof, in order to solve the above-mentioned problems.

It is another objective of the claimed invention to provide a method for performing meta block management, and to provide an associated memory device and a controller thereof, in order to enhance the performance of access to the Flash memory.

According to a preferred embodiment of the claimed invention, a method for performing meta block management is provided. The method is applied to a controller of a Flash memory having multiple channels, wherein the Flash memory comprises a plurality of blocks respectively corresponding to the channels. The method comprises: utilizing a meta block mapping table to store block grouping relationships respectively corresponding to a plurality of meta blocks, wherein blocks in each meta block respectively correspond to the channels; and when it is detected that a specific block corresponding to a specific channel within a meta block does not have remaining space for programming, according to the meta block mapping table, utilizing at least one blank block corresponding to the specific channel within at least one other meta block as extension of the specific block, for use of further programming. More particularly, based upon predetermined mapping relationships between logical addresses and the channels, in a situation where the controller operates in a page mode, the controller utilizing the method dynamically performs meta block management, in order to enhance performance of access to the Flash memory.

While the method mentioned above is disclosed, an associated memory device is further provided. The memory device comprises: a Flash memory having multiple channels, wherein the Flash memory comprises a plurality of blocks respectively corresponding to the channels; and a controller arranged to access the Flash memory and manage the plurality of blocks. In addition, the controller utilizes a meta block mapping table to store block grouping relationships respectively corresponding to a plurality of meta blocks, wherein blocks in each meta block respectively correspond to the channels. Additionally, when it is detected that a specific block corresponding to a specific channel within a meta block does not have remaining space for programming, according to the meta block mapping table, the controller utilizes at least one blank block corresponding to the specific channel within at least one other meta block as extension of the specific block, for use of further programming. More particularly, based upon predetermined mapping relationships between logical addresses and the channels, in a situation where the controller operates in a page mode, the controller dynamically performs meta block management, in order to enhance performance of the access to the Flash memory.

While the method mentioned above is disclosed, a controller of a memory device is further provided. The controller is utilized for accessing a Flash memory having multiple channels, wherein the Flash memory comprises a plurality of blocks respectively corresponding to the channels. The controller comprises: a read only memory (ROM) arranged to store a program code; and a microprocessor arranged to execute the program code to control the access to the Flash memory and manage the plurality of blocks. In addition, the controller that executes the program code by utilizing the microprocessor utilizes a meta block mapping table to store block grouping relationships respectively corresponding to a plurality of meta blocks, wherein blocks in each meta block respectively correspond to the channels. Additionally, when it is detected that a specific block corresponding to a specific channel within a meta block does not have remaining space for programming, according to the meta block mapping table, the controller that executes the program code by utilizing the microprocessor utilizes at least one blank block corresponding to the specific channel within at least one other meta block as extension of the specific block, for use of further programming. More particularly, based upon predetermined mapping relationships between logical addresses and the channels, in a situation where the controller operates in a page mode, the controller that executes the program code by utilizing the microprocessor dynamically performs meta block management, in order to enhance performance of the access to the Flash memory.

According to a preferred embodiment of the claimed invention, a method for performing meta block management is provided. The method is applied to a controller of a Flash memory having multiple channels, wherein the Flash memory comprises a plurality of blocks respectively corresponding to the channels. The method comprises: with regard to utilization statuses of a plurality of meta blocks, utilizing a data region, a spare region, and an active region within the Flash memory to perform classification on the meta blocks, wherein the meta blocks represent block grouping relationships of the blocks, blocks within each meta block respectively correspond to the channels, and any meta block that is classified into the data region is not a blank meta block, and any meta block that is classified into the spare region is a blank meta block; and when it is detected that a new blank meta block is required for use of programming, popping a meta block from the spare region to the active region, in order to perform programming operations. More particularly, in a situation where the controller operates in a page mode, by performing classification on the meta blocks, the controller utilizing the method dynamically performs meta block management, in order to enhance performance of access to the Flash memory.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
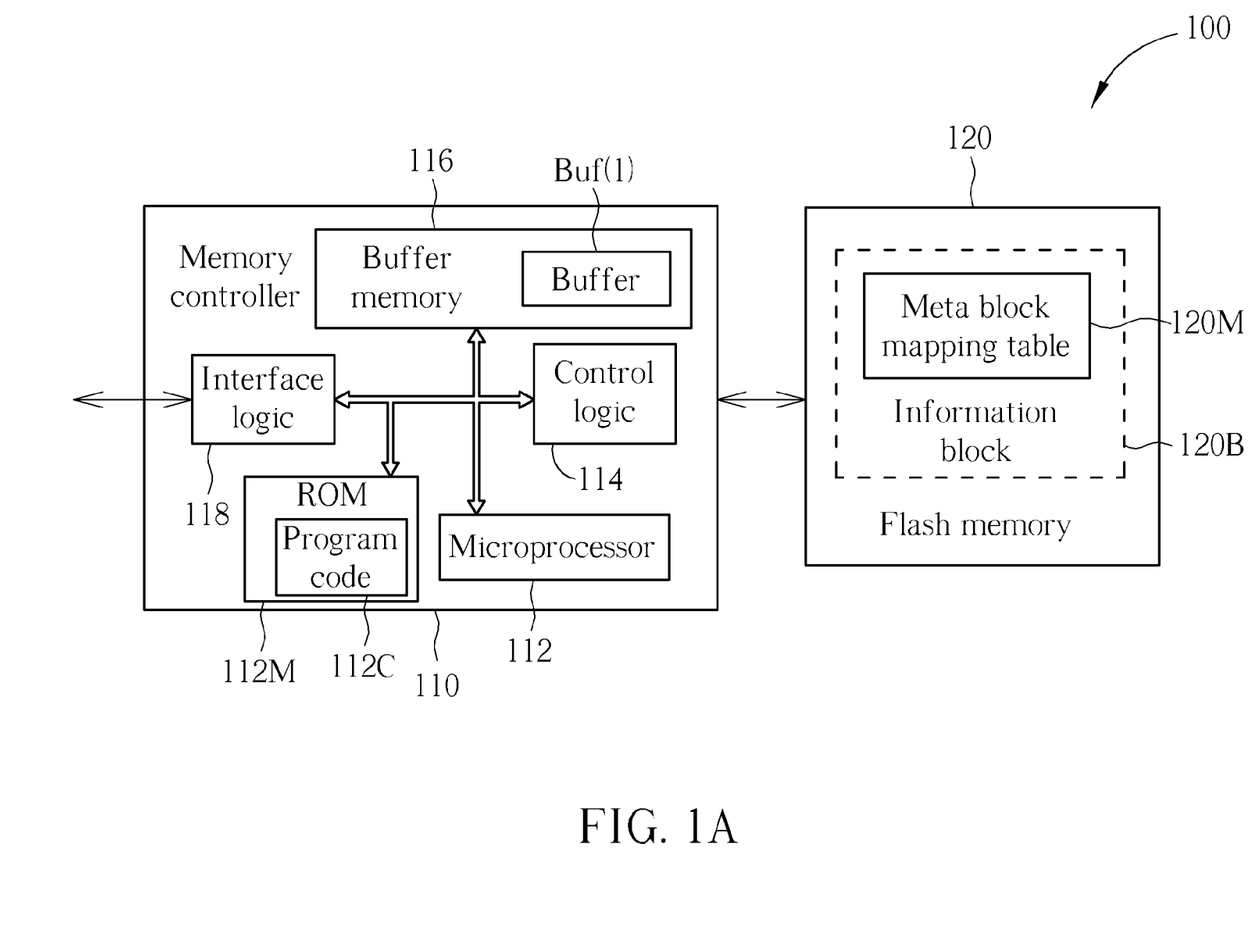
FIG. 1A is a diagram of a memory device according to a first embodiment of the present invention.

Please refer to FIG. 1A, which illustrates a diagram of a memory device 100 according to a first embodiment of the present invention. In particular, the memory device 100 of this embodiment can be a portable memory device, examples of which may include, but not limited to, memory cards complying with SD/MMC, CF, MS, or XD standards. Here, the portable memory device is taken as an example of the memory device 100 in this embodiment. This is for illustrative purposes only, and is not meant to be a limitation of the present invention. According to a variation of this embodiment, the memory device 100 can be a solid state drive (SSD). Referring to FIG. 1A, the memory device 100 comprises a Flash memory 120 comprising at least one information block 120B, and further comprises a controller arranged to access the Flash memory 120, where the aforementioned controller of this embodiment is a memory controller 110. According to this embodiment, the memory controller 110 comprises a microprocessor 112, a read only memory (ROM) 112M, a control logic 114, at least one buffer memory 116, and an interface logic 118. In addition, the ROM 112M is arranged to store a program code 112C, and the microprocessor 112 is arranged to execute the program code 112C to control the access to the Flash memory 120. Please note that the program code 112C can be stored in the buffer memory 116 or any of various kinds of memories according to variations of this embodiment.

As shown in FIG. 1A, the aforementioned at least one information block 120B is utilized for storing information regarding block management, and more particularly, a meta block mapping table 120M. According to this embodiment, the buffer memory 116 comprises a buffer Buf(1). For example, the buffer Buf(1) can be a buffering region of a plurality of buffering regions within the buffer memory 116. In another example, the aforementioned at least one buffer memory 116 comprises a plurality of buffer memories, one of which can be utilized for implementing the buffer Buf(1). In this embodiment, the aforementioned controller (e.g. the memory controller 110 that executes the program code 112C by utilizing the microprocessor 112) can store a previous version of the meta block mapping table 120M into the Flash memory 120, and store a copy version of the meta block mapping table 120M into the buffer Buf(1), for use of dynamically updating the meta block mapping table 120M. In addition, the controller stores the latest version of the meta block mapping table 120M within the buffer Buf(1) into the Flash memory 120, in order to replace the previous version of the meta block mapping table 120M.

Figure 1B:
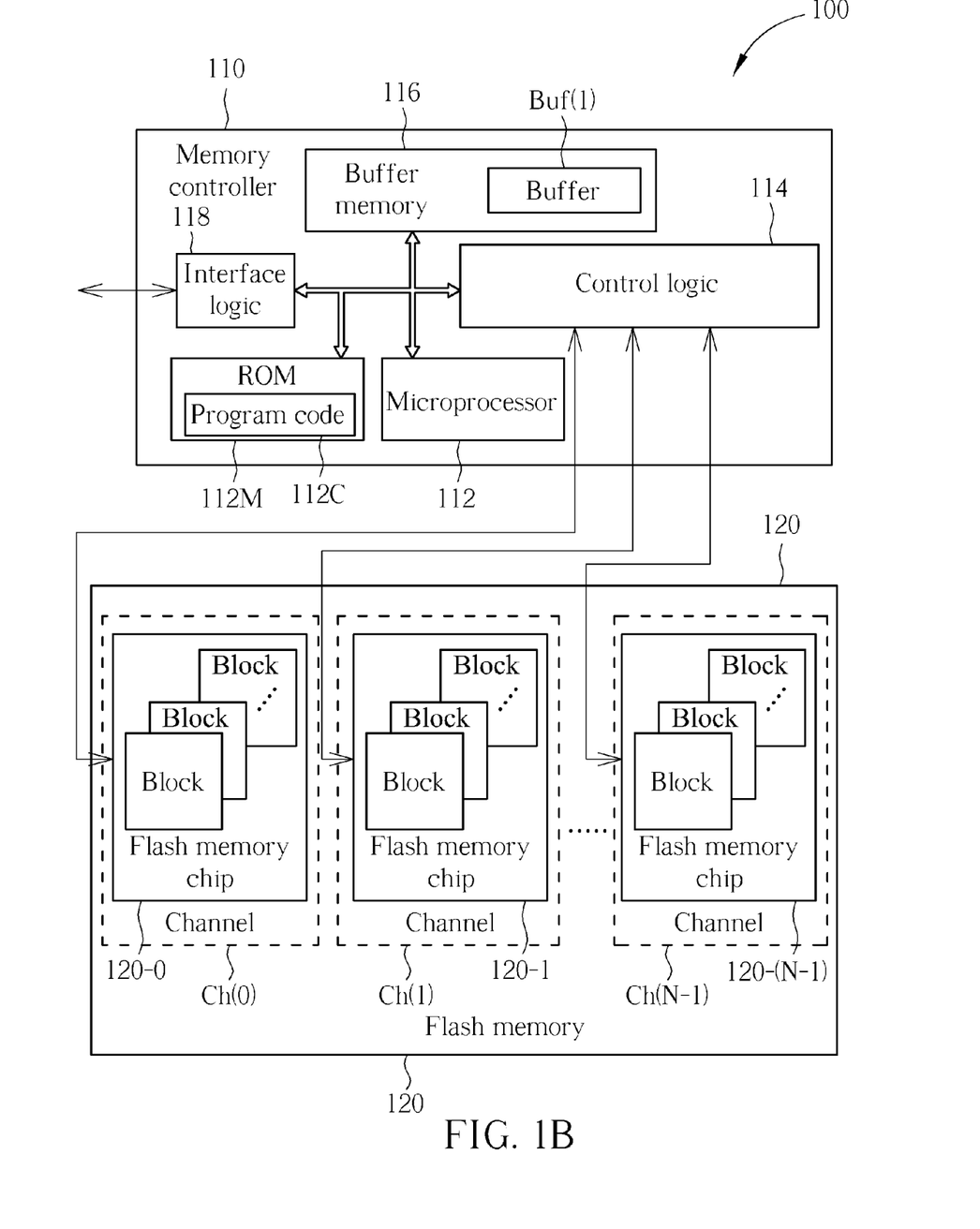
FIG. 1B illustrates some implementation details of the memory device shown in FIG. 1A according to an embodiment of the present invention.

FIG. 1B illustrates some implementation details of the memory device 100 shown in FIG. 1A according to an embodiment of the present invention. As shown in FIG. 1B, the aforementioned Flash memory 120 comprises a plurality of Flash memory chips such as the Flash memory chips 120-0, 120-1, ..., and 120-(N−1), where the Flash memory 120 has multiple channels such as the channels Ch(0), Ch(1), ..., and Ch(N−1), and the Flash memory chips such as the Flash memory chips 120-0, 120-1, ..., and 120-(N−1) respectively belong to the channels. Typically, in addition to the aforementioned at least one information block 120B, the Flash memory 120 further comprises a plurality of blocks respectively corresponding to the channels. When the controller (e.g. the memory controller 110 that executes the program code 112C by utilizing the microprocessor 112) performs data erasure operations on the Flash memory chips, the minimum erasure unit can be a block. In this embodiment, the controller performs data erasure operations in units of meta blocks, where a meta block may comprise some blocks respectively belonging to the channels, and the controller can erase the Flash memory 120 with the meta block being a minimum erasure unit. In addition, a block can be utilized for recording a specific amount of pages, and when the controller performs data programming/writing operations on any of the Flash memory chips, the minimum programming/writing unit can be a page.

In practice, the memory controller 110 that executes the program code 112C by utilizing the microprocessor 112 is capable of performing various control operations by utilizing the internal components within the memory controller 110. For example, the memory controller 110 utilizes the control logic 114 to control access to each Flash memory chip (e.g. operations of accessing at least one block or at least one page), utilizes the buffer memory 116 to perform buffering operations for the memory controller 110, and utilizes the interface logic 118 to communicate with a host device.

Figure 1C:
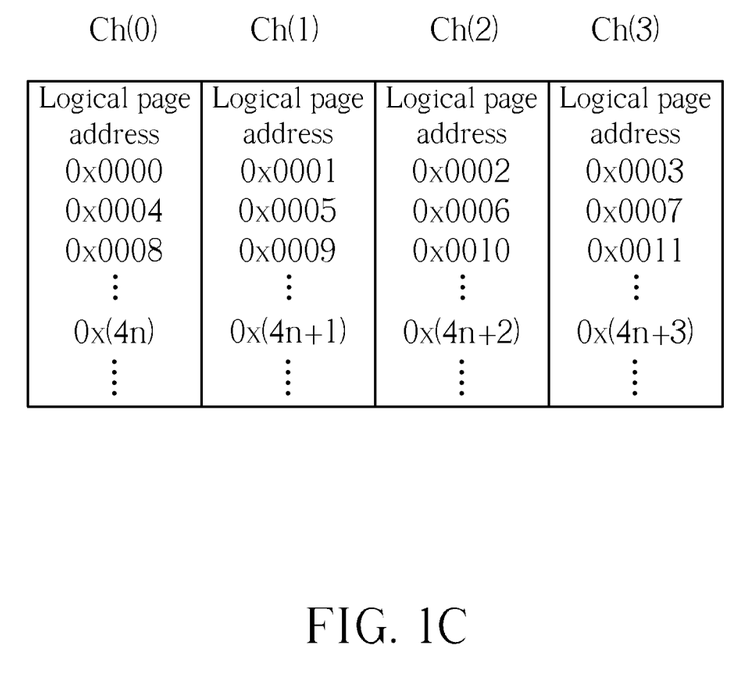
FIG. 1C illustrates some predetermined mapping relationships between logical addresses and channels within the memory device shown in FIG. 1A according to an embodiment of the present invention.

According to this embodiment, in addition to accessing the Flash memory 120, the memory controller 110 is capable of properly managing the plurality of blocks mentioned above. FIG. 1C illustrates some predetermined mapping relationships between logical addresses and the channels within the memory device 100 shown in FIG. 1A according to an embodiment of the present invention. More particularly, the predetermined mapping relationships between the logical addresses and the channels represent predetermined mapping relationships between a plurality of logical page addresses and the channels. According to this embodiment, the controller can operate in a page mode, and in this situation, no matter where the logical addresses of the data that the host device instructs the memory device 100 to write/program distribute within the range of all possible logical addresses, based upon the arrangement shown in FIG. 1C, the controller can achieve high performance during sequential reading operations that are performed after random writing operations are performed. More particularly, in a situation where the controller operates in the page mode, the controller can write/program data of logical addresses of discontinuous (or random) distribution into the same physical block page by page, and can also write/program different versions of update data that belong to the same page into a plurality of physical pages of one or more physical blocks page by page, and further record information regarding which of the physical pages stores the latest version of update data. The logical addresses of the data respectively stored in any two physical pages of the same physical block may differ greatly, and the difference between these logical addresses may be greater than the number of physical pages within a physical block. For example, in a situation where a certain physical block comprises 256 physical pages, for the stored data of a physical page in the physical block, the logical page address thereof may be 0x0000, and for the stored data of another physical page in the physical block, the logical page address thereof may be 0x2000, where the difference between the two logical page addresses is greater than 256. As shown in FIG. 1C, given that the notation "n" represents a non-negative integer, the logical page addresses 0x0000, 0x0004, 0x0008 ... 0x(4n) ... map to the Flash memory chip 120-0 on the channel Ch(0), and the data belonging to the aforementioned logical addresses should be stored into the Flash memory chip 120-0 on the channel Ch(0). The logical page addresses 0x0001, 0x0005, 0x0009 0x(4n+1) ... map to the Flash memory chip 120-1 on the channel Ch(1), and the data belonging to the aforementioned logical addresses should be stored into the Flash memory chip 120-1 on the channel Ch(1). The logical page addresses 0x0002, 0x0006, 0x0010 0x(4n+2) ... map to the Flash memory chip 120-2 on the channel Ch(2), and the data belonging to the aforementioned logical addresses should be stored into the Flash memory chip 120-2 on the channel Ch(2). The logical page addresses 0x0003, 0x0007, 0x0011 ... 0x(4n+3) map to the Flash memory chip 120-3 no the channel Ch(3), and the data belonging to the aforementioned logical addresses should be stored into the Flash memory chip 120-3 on the channel Ch(3). In other words, on a single Flash memory chip of the Flash memory chips, the difference between the logical page addresses mapped by any two physical pages is a multiple of the total number of channels within the memory device. For example, the host device sends a first write command to the memory device 100, in order to instruct the memory device 100 to write/program the data $D_0$ of the logical page address 0x0000. When receiving the first write command, the memory controller 110 writes/programs the data $D_0$ into a blank memory page (e.g. a first physical memory page) in a physical block (e.g. a first physical block) of the Flash memory chip 120-0 on the channel Ch(0). Afterward, the host device sends a second write command to the memory device 100, in order to instruct the memory device 100 to write/program the data $D_{2000}$ of the logical page address 0x2000. When receiving the second write command, the memory controller 110 writes/programs the data $D_{2000}$ into another blank memory page (e.g. a second physical memory page) in the first physical block of the Flash memory chip 120-0 on the channel Ch(0). The difference between the logical page addresses 0x0000 and 0x2000 is a multiple of the channel count (which is four in this embodiment). In other words, the difference between the logical page addresses on the same channel is related to the channel count. Additionally, the first physical memory page and the second physical memory page are adjacent physical memory pages, and with regard to the distribution of physical memory pages, the second physical memory page is next to the first physical memory page.

Figure 2:
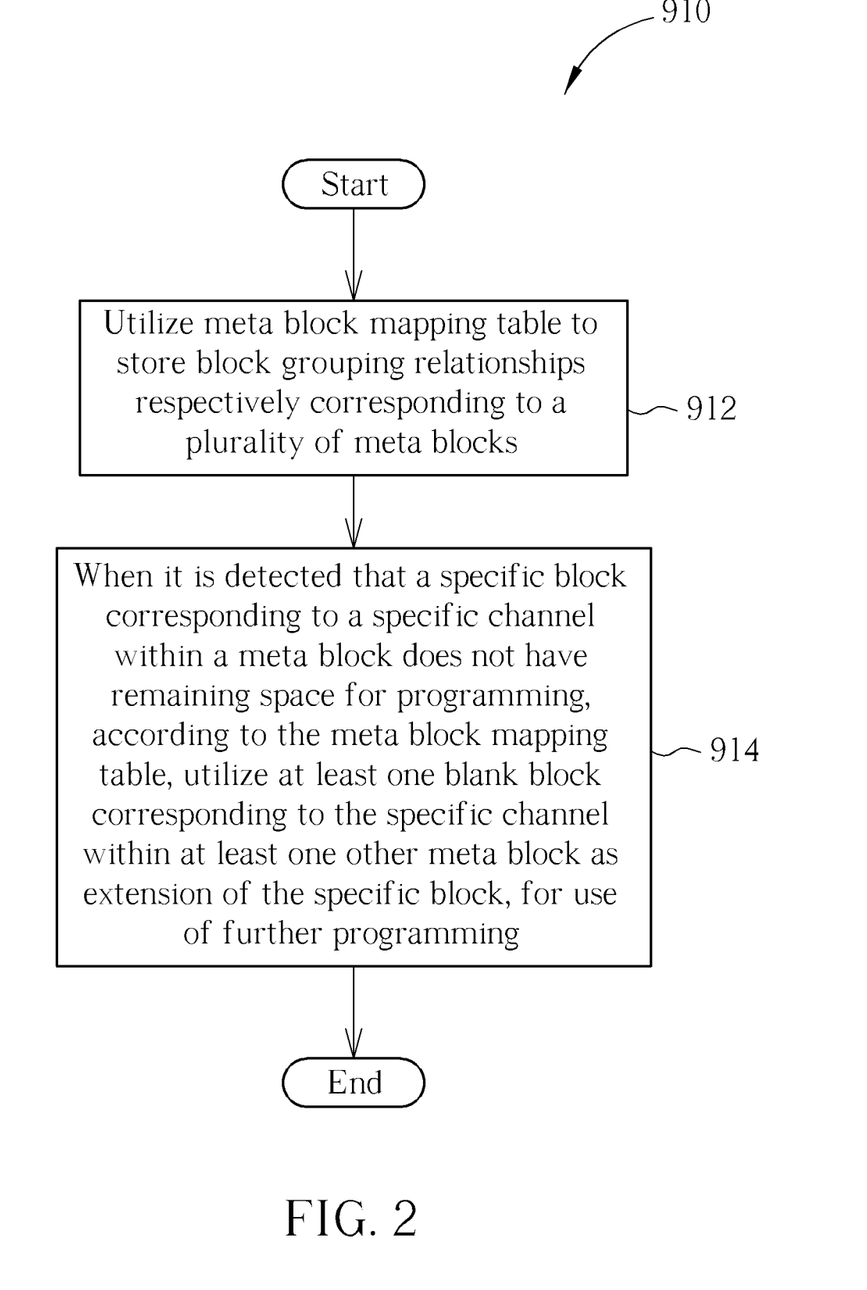
FIG. 2 is a flowchart of a method for performing meta block management according to an embodiment of the present invention.

Based upon the aforementioned predetermined mapping relationships between the logical addresses and the channels, such as the predetermined mapping relationships between the logical page addresses and the channels as disclosed in FIG. 1C, in a situation where the controller operates in a page mode, the controller is capable of dynamically performing meta block management, in order to enhance the performance of the access to the Flash memory 120. More particularly, the controller can dynamically group the plurality of blocks mentioned above into a plurality of meta blocks such as the meta blocks M(0), M(1), M(2), ..., etc., and dynamically update the meta block mapping table 120M, for reference of accessing data, where the meta blocks represent the block grouping relationships of the blocks, and the blocks within each meta block respectively correspond to the channels. Referring to FIG. 2, related details are further described as follows.

FIG. 2 is a flowchart of a method 910 for performing meta block management according to an embodiment of the present invention. The method can be applied to the memory device 100 in any of the respective embodiments shown in FIGS. 1A-1B (and associated variations), and more particularly, the controller of the Flash memory 120 having multiple channels, such as the aforementioned controller (e.g. the memory controller 110 that executes the program code 112C by utilizing the microprocessor 112). The method is described as follows.

In Step 912, the controller utilizes the aforementioned meta block mapping table 120M to store block grouping relationships respectively corresponding to a plurality of meta blocks such as the meta blocks M(0), M(1), M(2), ..., etc., where the blocks in each meta block respectively correspond to the channels such as the channels Ch(0), Ch(1), ..., and Ch(N−1). In practice, the controller can record the utilization statuses of the respective meta blocks M(0), M(1), M(2), ..., etc., and more particularly, can utilize the meta block mapping table 120M to record the utilization statuses of the respective meta blocks M(0), M(1), M(2), . . . , etc. For example, the utilization statuses recorded in the meta block mapping table 120M may respectively indicate whether the meta blocks M(0), M(1), M(2), . . . , etc. are blank meta blocks, where a blank meta block may represent a meta block that has been erased completely and has not been programmed/written since the latest erasure operation thereof.

In Step 914, when it is detected that a specific block corresponding to a specific channel within a meta block does not have remaining space for programming, according to the meta block mapping table 120M, the controller utilizes at least one blank block corresponding to the specific channel within at least one other meta block as extension of the specific block, for use of further programming. For example, the utilization statuses recorded in the meta block mapping table 120M may respectively indicate whether the meta blocks M(0), M(1), M(2), . . . , etc. are blank meta blocks, and the controller can determine the aforementioned at least one blank block accordingly. Thus, based upon the aforementioned predetermined mapping relationships between the logical addresses and the channels, in a situation where the controller operates in the page mode, the controller (e.g. the memory controller 110 that executes the program code 112C by utilizing the microprocessor 112) is capable of dynamically performing meta block management, in order to enhance the performance of the access to the Flash memory 120.

Figure 3A:
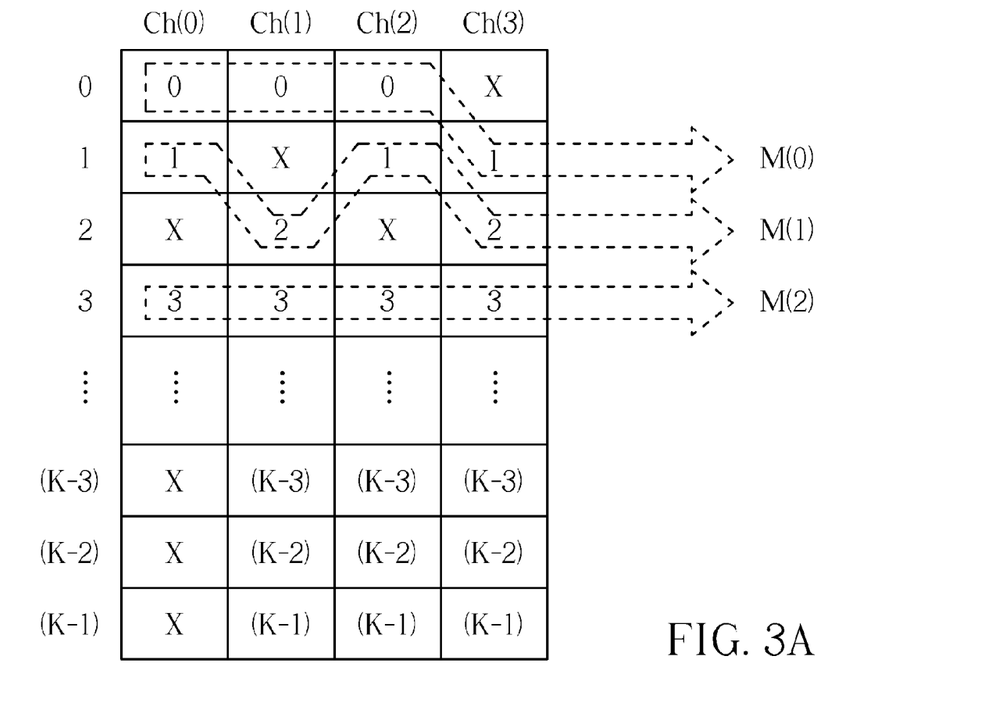
FIGS. 3A-3C illustrate some implementation details of the method shown in FIG. 2 according to an embodiment of the present invention.
Figure 3B:
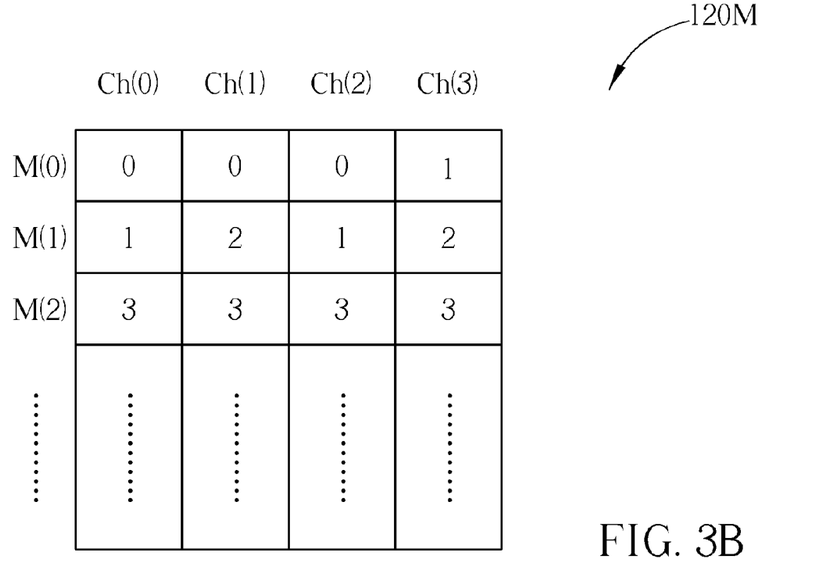
Figure 3C:
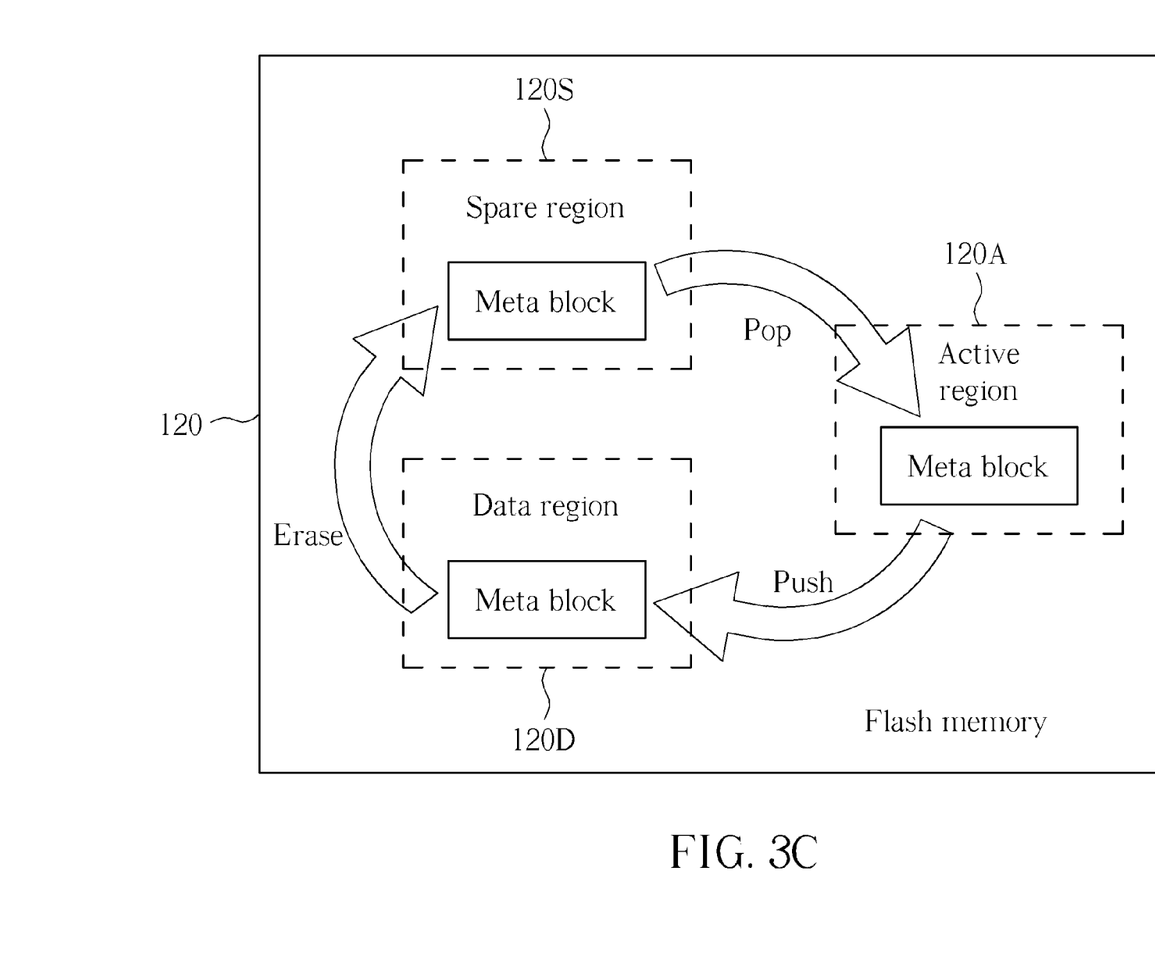

FIGS. 3A-3C illustrate some implementation details of the method 910 shown in FIG. 2 according to an embodiment of the present invention. As shown in FIG. 3A, in the number N of the channels Ch(0), Ch(1), . . . , and Ch(N−1) is equal to four, the respective blocks within the respective channels Ch(0), Ch(1), Ch(2), and Ch(3) can be respectively represented by the indexes 0, 1, 2, 3, . . . , (K−3), (K−2), and (K−1), where the notation "X" shown in FIG. 3A can be utilized for representing bad blocks. The controller can dynamically group the good blocks represented by these indexes into the meta blocks M(0), M(1), M(2), . . . , etc., and discard these bad blocks without using them. Please note that, these indexes may correspond to physical block addresses. This is for illustrative purposes only, and is not meant to be a limitation of the present invention. According to a variation of this embodiment, these indexes may represent physical block addresses respectively belonging to the corresponding channels.

As shown in FIG. 3B, in response to the grouping operation shown in FIG. 3A, the controller temporarily stores the indexes of the blocks that are respectively grouped into meta blocks into the meta block mapping table 120M correspondingly. For example, the meta block M(0) comprises the blocks $B_0(0)$, $B_1(0)$, $B_2(0)$, and $B_3(1)$ respectively corresponding to the channels Ch(0), Ch(1), Ch(2), and Ch(3), so the controller temporarily stores the indexes {0, 0, 0, 1} of the blocks $B_0(0)$, $B_1(0)$, $B_2(0)$, and $B_3(1)$ that are grouped into the same meta block M(0) into the respective fields corresponding to the meta block M(0) within the meta block mapping table 120M. In another example, the meta block M(1) comprises the blocks $B_0(1)$, $B_1(2)$, $B_2(1)$, and $B_3(2)$ respectively corresponding to the channels Ch(0), Ch(1), Ch(2), and Ch(3), so the controller temporarily stores the indexes {1, 2, 1, 2} of the blocks $B_0(1)$, $B_1(2)$, $B_2(1)$, and $B_3(2)$ that are grouped into the same meta block M(1) into the respective fields corresponding to the meta block M(1) within the meta block mapping table 120M. In another example, the meta block M(2) comprises the blocks $B_0(3)$, $B_1(3)$, $B_2(3)$, and $B_3(3)$ respectively corresponding to the channels Ch(0), Ch(1), Ch(2), and Ch(3), so the controller temporarily stores the indexes {3, 3, 3, 3} of the blocks $B_0(3)$, $B_1(3)$, $B_2(3)$, and $B_3(3)$ that are grouped into the same meta block M(2) into the respective fields corresponding to the meta block M(2) within the meta block mapping table 120M.

In addition, as shown in FIG. 3C, with regard to the utilization statuses of the meta blocks M(0), M(1), M(2), . . . , etc., the controller can utilize a data region 120D, a spare region 120S, and an active region 120A within the Flash memory 120 to perform classification on the meta blocks, where the data region 120D, the spare region 120S, and the active region 120A represent logical region division, rather than physical region division. Please note that any meta block that is classified into the data region 120D is not a blank meta block, and any meta block that is classified into the spare region 120S is a blank meta block. For example, with regard to any meta block M(k) within the meta blocks M(0), M(1), M(2), . . . , etc. (where the notation "k" represents a non-negative integer in this embodiment), when it is detected that each block within the meta block M(k) does not have remaining space for programming, the controller pushes the meta block M(k) into the data region 120D. Thus, when this meta block under consideration, such as the meta block M(k), is classified into the data region 120D, this means the meta block M(k) is not a blank meta block (i.e. the meta block M(k) is utilized). After some operations, when it is detected that each block within the meta block M(k) does not have any valid page, which means each block within the meta block M(k) does not have any valid data, the controller erases the meta block M(k) and classifies the meta block M(k) into the spare region 120S. Thus, when this meta block under consideration, such as the meta block M(k), is classified into the spare region 120S, this means the meta block M(k) is a blank meta block (i.e. the meta block M(k) is not utilized since the latest erasure operation thereof). As a result, when it is detected that a new blank meta block is required for use of programming, the controller can pop the meta block M(k) from the spare region 120S to the active region 120A, in order to perform programming operations. Thus, when this meta block under consideration, such as the meta block M(k), is classified into the active region 120A, this means the meta block M(k) can be utilized for being programmed/written by the controller. In a situation where the controller operates in the page mode, by performing classification (e.g. the classification operations disclosed in FIG. 3C) on the meta blocks, the controller can dynamically perform meta block management, in order to enhance performance of access to the Flash memory 120. Related details regarding the operations that the controller performs on the meta blocks within the active region 120A are further described as follows.

Figure 4A:
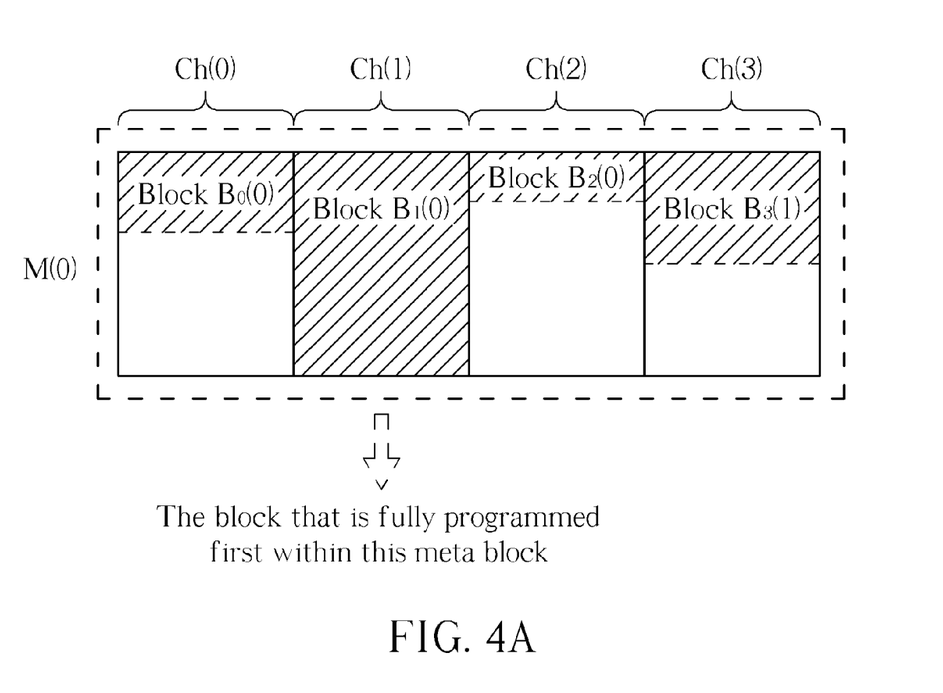
FIGS. 4A-4B illustrate some implementation details of the method shown in FIG. 2 according to another embodiment of the present invention.
Figure 4B:
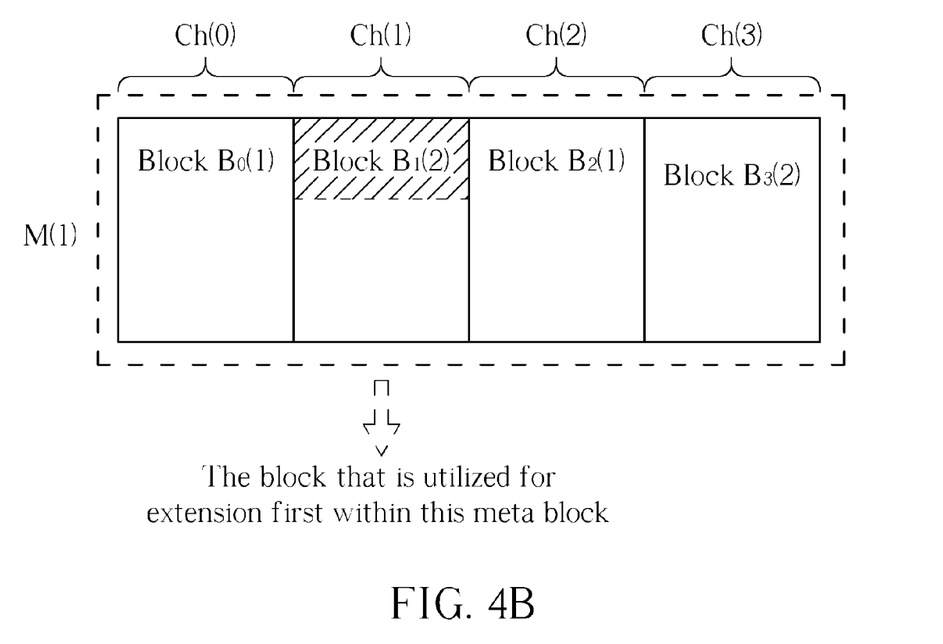

FIGS. 4A-4B illustrate some implementation details of the method 910 shown in FIG. 2 according to another embodiment of the present invention, where this embodiment is a variation of the embodiment shown in FIGS. 3A-3C. As shown in FIG. 4A, the shaded portions in the respective blocks represent the portions that have been written/programmed with data currently. For example, in a situation where the block $B_1(0)$ corresponding to the channel Ch(1) is the block that is fully programmed first within the meta block M(0) (i.e. there is no remaining space/page for programming in this block), "the specific block corresponding to the specific channel" under consideration in this embodiment can be the block $B_1(0)$ corresponding to the channel Ch(1). As shown in FIG. 4B, when it is detected that the block $B_1(0)$ corresponding to the channel Ch(1) within the meta block M(0) is fully programmed, the controller finds one or more other meta blocks, each of which is not utilized since the latest erasure operation thereof, within the spare region 120S, and according to the meta block mapping table 120M, the controller further utilizes at least one blank block corresponding to the channel Ch(1) within at least one other meta block, such as the block $B_1(2)$ corresponding to the channel Ch(1) within the meta block M(1), as extension of the block $B_1(0)$, for use of further programming. More particularly, in a situation where the at least one blank block corresponding to the channel Ch(1), such as the block $B_1(2)$, is utilized as extension of the block $B_1(0)$, according to the meta block mapping table 120M, the controller utilizes at least one blank block corresponding to at least one other channel within the aforementioned at least one other meta block such as the meta block M(1) (e.g. the blocks $B_0(1)$, $B_2(1)$, and $B_3(2)$ respectively corresponding to the channels Ch(0), Ch(2), and Ch(3)) as extension of at least one other block corresponding to the at least one other channel within the meta block M(0) to which the block $B_1(0)$ belongs (e.g. the blocks $B_0(0)$, $B_2(0)$, and $B_3(1)$ respectively corresponding to the channels Ch(0), Ch(2), and Ch(3)), for use of further programming. Thus, the meta blocks M(0) and M(1) can be regarded as a meta block group.

Figure 5A:
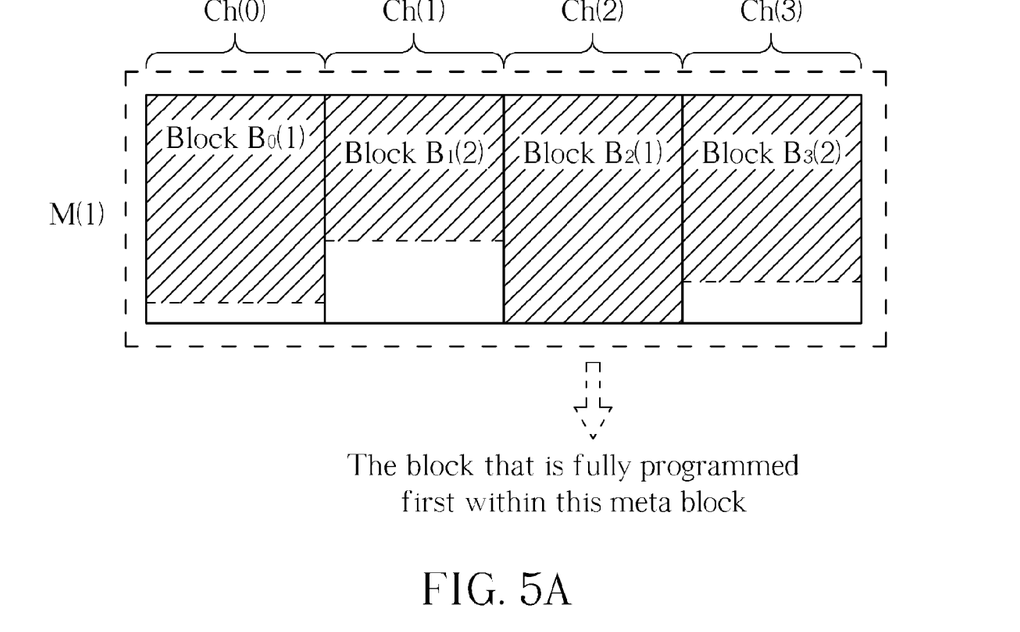
FIGS. 5A-5C illustrate some implementation details of the method shown in FIG. 2 according to another embodiment of the present invention.
Figure 5B:
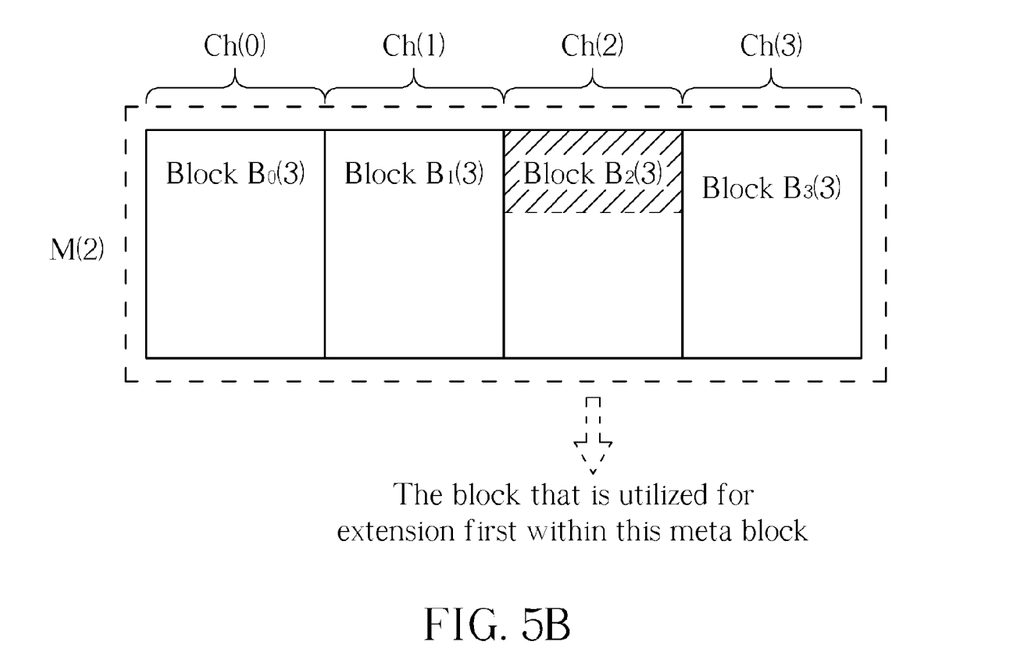

In general, the aforementioned at least one other meta block may comprise a plurality of meta blocks. For example, in the embodiment shown in FIGS. 5A-5C, the aforementioned at least one other meta block may comprise a first meta block such as the meta block M(1) and a second meta block such as the meta block M(2). More particularly, the aforementioned at least one blank block may comprise a first blank block such as the block $B_1(2)$ and a second blank block such as the block $B_1(3)$. Thus, the controller utilizes the block $B_1(2)$ corresponding to the channel Ch(1) within the meta block M(1) as extension of the block $B_1(0)$, and utilizes the block $B_1(3)$ corresponding to the channel Ch(1) within the meta block M(2) as extension of the block $B_1(0)$. In addition, in situation where the first blank block and the second blank block, such as the blocks $B_1(2)$ and $B_1(3)$, are utilized as extension of the specific block such as the block $B_1(0)$, according to the meta block mapping table 120M, the controller utilizes at least one blank block corresponding to at least one other channel within the meta block M(1) (e.g. the blocks $B_0(1)$, $B_2(1)$, and $B_3(2)$ respectively corresponding to the channels Ch(0), Ch(2), and Ch(3)) and at least one blank block corresponding to the at least one other channel within the meta block M(2) (e.g. the blocks $B_0(3)$, $B_2(3)$, and $B_3(3)$ respectively corresponding to the channels Ch(0), Ch(2), and Ch(3)) as extension of at least one other block corresponding to the at least one other channel within the meta block M(0) to which the block $B_1(0)$ belongs (e.g. the blocks $B_0(0)$, $B_2(0)$, and $B_3(1)$ respectively corresponding to the channels Ch(0), Ch(2), and Ch(3)), for use of further programming.

For better comprehension, "the specific block corresponding to the specific channel" under consideration in this embodiment (i.e. the embodiment shown in FIGS. 5A-5C) can dynamically be changed from the block $B_1(0)$ to another block such as the block $B_2(1)$. For example, in a situation where the block $B_2(1)$ corresponding to the channel Ch(2) is the block that is fully programmed first within the meta block M(1), the descriptions regarding the block $B_1(0)$ in the embodiment shown in FIGS. 4A-4B can be applied to the block $B_2(1)$ of this embodiment. Please note that the meta block M(2) can be regarded as a new member of the meta block group, where the blocks $B_0(3)$, $B_1(3)$, $B_2(3)$, and $B_3(3)$ can be regarded as extension of the blocks $B_0(1)$, $B_1(2)$, $B_2(1)$, and $B_3(2)$, respectively. Similar descriptions are not repeated in detail for this embodiment.

Figure 5C:
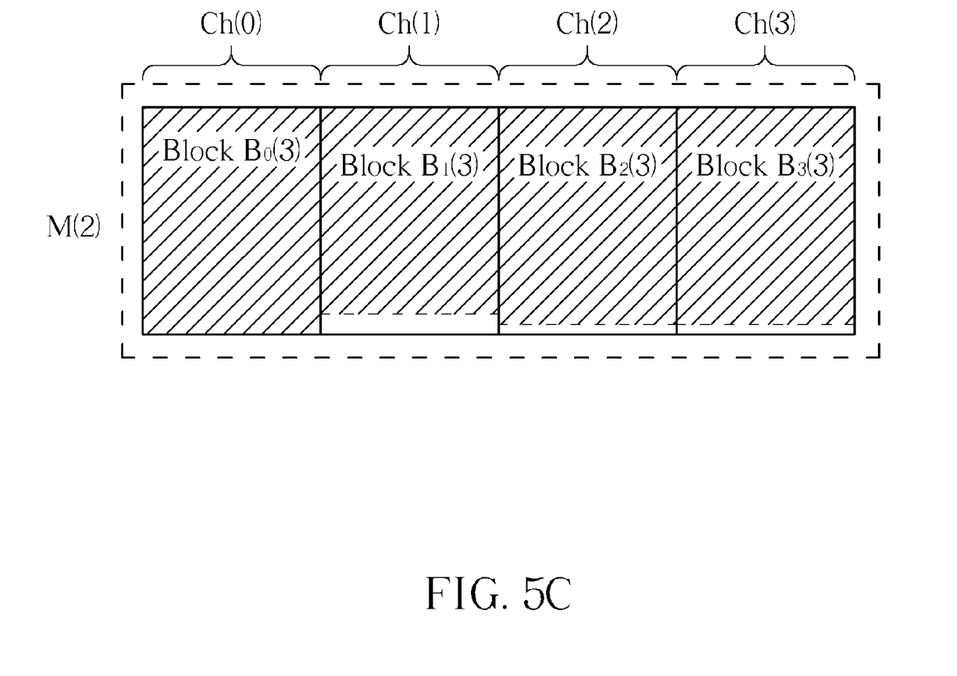

According to a variation of this embodiment, the controller can dynamically adjust the number of the at least one other meta block mentioned in Step 914 according to at least one access characteristic caused by the host device. For example, with regard to a series of random writing/programming operations triggered by the host device, when utilizing a single meta block such as the meta block M(0) shown in FIG. 4A, the controller probably cannot perform writing/programming on the respective channels uniformly. However, in a situation where multiple meta blocks such as the meta blocks M(0), M(1), and M(2) are utilized, the differences between accumulated data amounts of writing/programming due to the series of random writing/programming operations can be decreased. As a result, when it is detected that the block $B_0(3)$ corresponding to the channel Ch(0) within the meta block M(2) shown in FIG. 5C is fully programmed, the other blocks $B_1(3)$, $B_2(3)$, and $B_3(3)$ within the same meta block M(2) can almost achieve the status of being fully programmed. Similar descriptions are not repeated in detail for this variation.

According to another variation of this embodiment, when each block within the meta block to which the specific block mentioned in Step 914 belongs is fully programmed, the controller can store valid data therein into the aforementioned at least one other meta block, and dynamically update the meta block mapping table 120M to remove the mapping information of the meta block to which the specific block belongs. For example, when each block within the meta block M(0) to which the block $B_1(0)$ belongs (e.g. each of the blocks $B_0(0)$, $B_1(0)$, $B_2(0)$, and $B_3(1)$) is fully programmed, the controller can remove the meta block M(0) from the meta block group to which the meta block M(0) belongs. In addition, the controller can store the valid data in the meta block M(0) into the aforementioned at least one other meta block such as the meta block M(Z) (where the notation "Z" represents a positive integer), allowing the meta block M(0) to be erased and therefore become a blank meta block for being re-used. Additionally, the controller can dynamically update the meta block mapping table 120M to remove the mapping information of the meta block M(0) to which the block $B_1(0)$ belongs. Similar descriptions are not repeated in detail for this variation.

It is an advantage of the present invention that the meta block management implemented according to the present invention can enhance the overall channel bandwidth of the Flash memory having multiple channels. In addition, the related art problem of excessively utilizing a certain channel is no longer an issue. In contrast to the related art, in a situation where the chip area and the associated costs are not greatly increased, the present invention can achieve the goal of giving consideration to both operation performance and system resource management.

Those skilled in the art will readily observe that numerous modifications and alterations of the device and method may be made while retaining the teachings of the invention.

What is claimed is:

1. A method for performing meta block management, the method being applied to a controller of a Flash memory having multiple channels, the Flash memory comprising a plurality of blocks respectively corresponding to the channels, the method comprising:

utilizing a meta block mapping table to store block grouping relationships respectively corresponding to a plurality of meta blocks, wherein blocks in each meta block respectively correspond to the channels; and when it is detected that a specific block corresponding to a specific channel within a meta block does not have remaining space for programming, according to the meta block mapping table, utilizing at least one blank block corresponding to the specific channel within at least one other meta block as extension of the specific block, for use of further programming;

wherein based upon predetermined mapping relationships between logical addresses and the channels, in a situation where the controller operates in a page mode, the controller utilizing the method dynamically performs meta block management, in order to enhance performance of access to the Flash memory.

2. The method of claim 1, wherein the step of utilizing the at least one blank block corresponding to the specific channel within the at least one other meta block as extension of the specific block for use of further programming further comprises:

in situation where the at least one blank block corresponding to the specific channel is utilized as extension of the specific block, according to the meta block mapping table, utilizing at least one blank block corresponding to at least one other channel within the at least one other meta block as extension of at least one other block corresponding to the at least one other channel within the meta block to which the specific block belongs, for use of further programming.

3. The method of claim 1, wherein the at least one other meta block comprises a first meta block and a second meta block, and the at least one blank block comprises a first blank block and a second blank block; and the step of utilizing the at least one blank block corresponding to the specific channel within the at least one other meta block as extension of the specific block for use of further programming further comprises:

utilizing the first blank block and the second blank block as extension of the specific block.

4. The method of claim 3, wherein the step of utilizing the at least one blank block corresponding to the specific channel within the at least one other meta block as extension of the specific block for use of further programming further comprises:

in situation where the first blank block and the second blank block are utilized as extension of the specific block, according to the meta block mapping table, utilizing at least one blank block corresponding to at least one other channel within the first meta block and at least one blank block corresponding to the at least one other channel within the second meta block as extension of at least one other block corresponding to the at least one other channel within the meta block to which the specific block belongs, for use of further programming.

5. The method of claim 1, further comprising:

when each block within the meta block to which the specific block belongs is fully programmed, storing valid data therein into the at least one other meta block, and dynamically updating the meta block mapping table to remove mapping information of the meta block to which the specific block belongs.

6. The method of claim 1, further comprising:

storing a previous version of the meta block mapping table into the Flash memory, and storing a copy version of the meta block mapping table into a buffer of the controller, for use of dynamically updating the meta block mapping table; and storing a latest version of the meta block mapping table within the buffer into the Flash memory, in order to replace the previous version of the meta block mapping table.

7. The method of claim 1, further comprising:

dynamically adjusting a number of the at least one other meta block according to at least one access characteristic caused by a host device.

8. The method of claim 1, wherein the predetermined mapping relationships between the logical addresses and the channels represent predetermined mapping relationships between a plurality of logical page addresses and the channels.

9. A memory device, comprising:

a Flash memory having multiple channels, wherein the Flash memory comprises a plurality of blocks respectively corresponding to the channels; and a controller arranged to access the Flash memory and manage the plurality of blocks, wherein the controller utilizes a meta block mapping table to store block grouping relationships respectively corresponding to a plurality of meta blocks, and blocks in each meta block respectively correspond to the channels, and when it is detected that a specific block corresponding to a specific channel within a meta block does not have remaining space for programming, according to the meta block mapping table, the controller utilizes at least one blank block corresponding to the specific channel within at least one other meta block as extension of the specific block, for use of further programming;

wherein based upon predetermined mapping relationships between logical addresses and the channels, in a situation where the controller operates in a page mode, the controller dynamically performs meta block management, in order to enhance performance of the access to the Flash memory.

10. The memory device of claim 9, wherein in situation where the at least one blank block corresponding to the specific channel is utilized as extension of the specific block, according to the meta block mapping table, the controller utilizes at least one blank block corresponding to at least one other channel within the at least one other meta block as extension of at least one other block corresponding to the at least one other channel within the meta block to which the specific block belongs, for use of further programming.

11. The memory device of claim 9, wherein the at least one other meta block comprises a first meta block and a second meta block, and the at least one blank block comprises a first blank block and a second blank block; and the controller utilizes the first blank block and the second blank block as extension of the specific block.

12. The memory device of claim 11, wherein in situation where the first blank block and the second blank block are utilized as extension of the specific block, according to the meta block mapping table, the controller utilizes at least one blank block corresponding to at least one other channel within the first meta block and at least one blank block corresponding to the at least one other channel within the second meta block as extension of at least one other block corresponding to the at least one other channel within the meta block to which the specific block belongs, for use of further programming.

13. The memory device of claim 9, wherein when each block within the meta block to which the specific block belongs is fully programmed, the controller stores valid data therein into the at least one other meta block, and dynamically updates the meta block mapping table to remove mapping information of the meta block to which the specific block belongs.

14. The memory device of claim 9, wherein the controller stores a previous version of the meta block mapping table into the Flash memory, and stores a copy version of the meta block mapping table into a buffer of the controller, for use of dynamically updating the meta block mapping table; and the controller stores a latest version of the meta block mapping table within the buffer into the Flash memory, in order to replace the previous version of the meta block mapping table.

15. The memory device of claim 9, wherein the controller dynamically adjusts a number of the at least one other meta block according to at least one access characteristic caused by a host device.

16. The memory device of claim 9, wherein the predetermined mapping relationships between the logical addresses and the channels represent predetermined mapping relationships between a plurality of logical page addresses and the channels.

17. A controller of a memory device, the controller being utilized for accessing a Flash memory having multiple channels, the Flash memory comprising a plurality of blocks respectively corresponding to the channels, the controller comprising:
- a read only memory (ROM) arranged to store a program code; and
- a microprocessor arranged to execute the program code to control the access to the Flash memory and manage the plurality of blocks, wherein the controller that executes the program code by utilizing the microprocessor utilizes a meta block mapping table to store block grouping relationships respectively corresponding to a plurality of meta blocks, and blocks in each meta block respectively correspond to the channels, and when it is detected that a specific block corresponding to a specific channel within a meta block does not have remaining space for programming, according to the meta block mapping table, the controller that executes the program code by utilizing the microprocessor utilizes at least one blank block corresponding to the specific channel within at least one other meta block as extension of the specific block, for use of further programming;

wherein based upon predetermined mapping relationships between logical addresses and the channels, in a situation where the controller operates in a page mode, the controller that executes the program code by utilizing the microprocessor dynamically performs meta block management, in order to enhance performance of the access to the Flash memory.

18. The controller of claim 17, wherein in situation where the at least one blank block corresponding to the specific channel is utilized as extension of the specific block, according to the meta block mapping table, the controller that executes the program code by utilizing the microprocessor utilizes at least one blank block corresponding to at least one other channel within the at least one other meta block as extension of at least one other block corresponding to the at least one other channel within the meta block to which the specific block belongs, for use of further programming.

19. The controller of claim 17, wherein the at least one other meta block comprises a first meta block and a second meta block, and the at least one blank block comprises a first blank block and a second blank block; and the controller that executes the program code by utilizing the microprocessor utilizes the first blank block and the second blank block as extension of the specific block.

20. A method for performing meta block management, the method being applied to a controller of a Flash memory having multiple channels, the Flash memory comprising a plurality of blocks respectively corresponding to the channels, the method comprising:
- with regard to utilization statuses of a plurality of meta blocks, utilizing a data region, a spare region, and an active region within the Flash memory to perform classification on the meta blocks, wherein the meta blocks represent block grouping relationships of the blocks, blocks within each meta block respectively correspond to the channels, and any meta block that is classified into the data region is not a blank meta block, and any meta block that is classified into the spare region is a blank meta block; and
- when it is detected that a new blank meta block is required for use of programming, popping a meta block from the spare region to the active region, in order to perform programming operations;

wherein in a situation where the controller operates in a page mode, by performing classification on the meta blocks, the controller utilizing the method dynamically performs meta block management, in order to enhance performance of access to the Flash memory.

* * * * *